US 8,374,332 B2

(12) United States Patent
Creamer et al.

(10) Patent No.: US 8,374,332 B2
(45) Date of Patent: Feb. 12, 2013

(54) AUTOMATIC CALL COMPLETION IN A DIRECTORY ASSISTANCE SYSTEM

(75) Inventors: Thomas E Creamer, Boca Raton, FL (US); Peeyush Jaiswal, Boca Raton, FL (US); Victor S Moore, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 12/849,137

(22) Filed: Aug. 3, 2010

(65) Prior Publication Data

US 2010/0316210 A1 Dec. 16, 2010

Related U.S. Application Data

(62) Division of application No. 10/852,909, filed on May 25, 2004, now Pat. No. 7,792,267.

(51) Int. Cl.
*H04M 3/42* (2006.01)
(52) U.S. Cl. ......... 379/218.01; 379/114.21; 379/127.01; 455/457
(58) Field of Classification Search ............. 379/218.01, 379/219, 207.02, 211.01, 211.02, 114.21, 379/127.07; 455/414.2, 457
See application file for complete search history.

(56) References Cited

U.S. PATENT DOCUMENTS

| 5,724,412 A * | 3/1998 | Srinivasan ................. 379/93.23 |
| 6,473,612 B1 * | 10/2002 | Cox et al. .................. 455/414.2 |
| 2004/0161093 A1 * | 8/2004 | Cox et al. ................. 379/218.01 |
| 2005/0018829 A1 * | 1/2005 | Baker ....................... 379/207.02 |
| 2005/0053220 A1 * | 3/2005 | Helbling et al. ......... 379/211.02 |

* cited by examiner

*Primary Examiner* — William Deane, Jr.
(74) *Attorney, Agent, or Firm* — Steven M. Greenberg, Esq.; Carey, Rodriguez, Greenberg & O'Keefe

(57) ABSTRACT

A method, system and apparatus for automatic call completion in a directory assistance system in concert with the public switched telephone network (PSTN). In accordance with the present invention, a method for automatic call completion in a directory assistance system can include receiving and processing a directory assistance request from a calling party over the PSTN. An address for the calling party can be retrieved from the PSTN and an address for a telephone number produced by the directory assistance request can be second retrieved from within the directory assistance system. Prospective telephone charges can be computed based upon the retrieved addresses and the calling party can be prompted with the computed prospective charges. Finally, a call can be automatically completed between the calling party and the telephone number.

11 Claims, 3 Drawing Sheets

AUTOMATIC CALL COMPLETION IN A DIRECTORY ASSISTANCE SYSTEM

CROSS-REFERENCE TO RELATED APPLICATIONS

This application is a Divisional of U.S. application Ser. No. 10/852,909, filed May 25, 2004, entitled "AUTOMATIC CALL COMPLETION IN A DIRECTORY ASSISTANCE SYSTEM," the entirety of which is incorporated herein by reference.

BACKGROUND OF THE INVENTION

1. Statement of the Technical Field

The present invention relates to delivering directory assistance services to a telephone subscriber, and more particularly to automatic call completion in a directory assistance system through a public switched telephone network (PSTN).

2. Description of the Related Art

The intelligent network of today bears little semblance to the PSTN of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), the Local Number Portability (LNP) database, the Toll Free Calling database and other databases containing additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs)—databases containing service logic and subscriber information—which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

Despite the wealth of information associated with a telephone caller stored in the LIDB, the LIDB seems to remain an untapped resource suitable only for advanced telephony billing applications. Accordingly, many conventional inconveniences remain prevalent in the world of the call center. For instance, in a directory assistance system, when a calling party requests a telephone number lookup, the directory assistance system can automatically connect the calling party to the selected phone number retrieved in consequence of the lookup operation. Notably, the call can be connected regardless of the telephone charges associated with the call, including long distance charges. In fact, typically, the calling party remains unaware of such charges and the calling party may decline the use of the automatic connection service without certain knowledge of the cost of the proposed telephone call.

SUMMARY OF THE INVENTION

The present invention addresses the deficiencies of the art in respect to providing automatic call completion in a directory assistance system and provides a novel and non-obvious method, system and apparatus for automatic call completion in a directory assistance system acting in concert with the PSTN. In accordance with the present invention, a method for automatic call completion in a directory assistance system can include receiving and processing a directory assistance request from a calling party over the PSTN. An address for the calling party can be retrieved from the PSTN and an address for a telephone number produced by the directory assistance request can be second retrieved from within the directory assistance system. Prospective telephone charges can be computed based upon the retrieved addresses and the calling party can be prompted with the computed prospective charges. Finally, a call can be automatically completed between the calling party and the telephone number.

The processing step can include performing a telephone number lookup for the request in an enterprise system in a directory assistance system. Similarly, the processing step can include performing a reverse telephone number lookup for the request in an enterprise system in a directory assistance system. The second retrieving step can include receiving a data communications message from a name resolution adapter disposed within the PSTN and extracting an address for the calling party from the message. For instance, the second retrieving step can include the steps of querying a LIDB through a name resolution adapter disposed in the PSTN for an address for the calling party.

The computing step can include the step of computing prospective telephone connection charges based upon the retrieved addresses. The computing step also can include the step of computing prospective telephone per minute usage charges based upon the retrieved addresses. Finally, the automatically completing step can include receiving a selection from the calling party responsive to the prompting step and completing the call if the selection indicates an affirmative choice by the calling party to complete the call. Otherwise the system can exit.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for automatic call completion in a directory assistance system. In accordance with the present invention, the location of a calling party can be determined in the PSTN. Concurrently, a lookup operation requested by the calling party can be computed in the directory assistance system. Using the location of the calling party and the location returned from the lookup operation, estimated telephone charges can be computed for completing the call to the resulting phone number returned by the lookup operation. Subsequently, the calling party can be prompted with the estimated telephone charges to better advise the calling party whether to permit automatic call completion. In this way, more pertinent, relevant information can be provided to the calling party as part of a directory assistance request by relying upon known and accessible locale information disposed within the PSTN.

Figure 1:
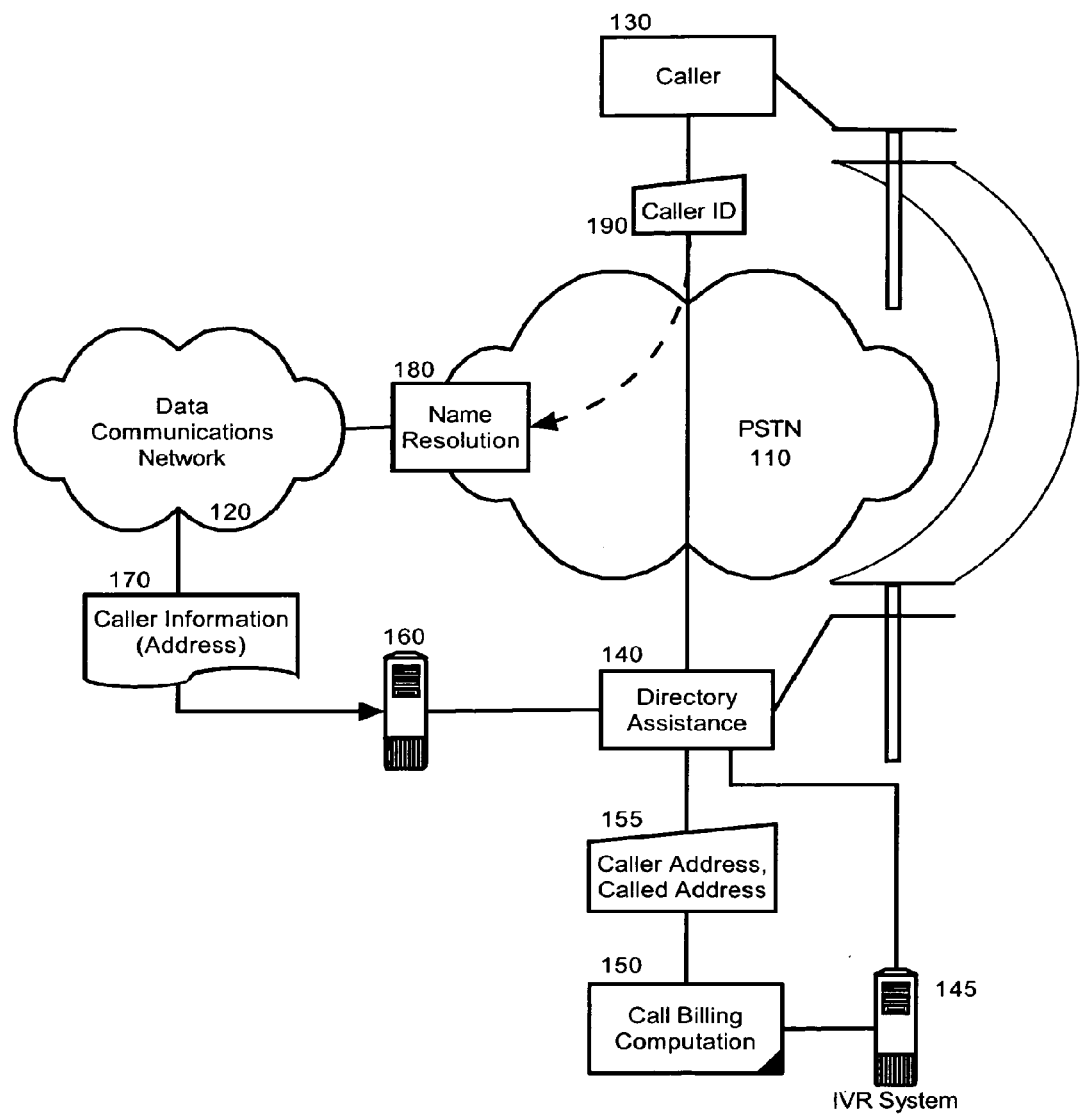
FIG. 1 is a block diagram illustrating a process for providing automatic call completion in a directory assistance system through a PSTN according to the inventive arrangements.

In further illustration, FIG. 1 is a block diagram illustrating a process for providing automatic call completion in a directory assistance system through a PSTN according to the inventive arrangements. Specifically, a caller 130 can be coupled telephonically to a directory assistance system 140 by way of the PSTN 110. The directory assistance system 140 can be configured to process lookup requests for callers and to provide telephone numbers in response to the lookup requests. Preferably, the lookup requests and responses can be provided audibly through the operation of an interactive voice response system 145, although the invention is not so limited to the precise arrangement shown in FIG. 1 to include the interactive voice response system 145. Finally, the directory assistance system 140 can include a call billing computation processor 150 configured to compute estimated telephone charges for automatically completing a telephone call based upon address information 155.

In operation, as the caller 130 initiates the telephone call in the PSTN 110, a name resolution adapter 180 disposed within the PSTN 110 can capture caller identifying data 190 for the telephone used by the caller 130 in order to identify the caller 130. Using the caller identifying data 190, the name resolution adapter 180 can produce specific identification data for the caller 130, for instance a name, address, phone number, credit card number, or account number, to name a few. In this regard, the name resolution adapter 180 can query one or more databases disposed within the PSTN 110, including a LIDB, to obtain the specific identification data based upon the caller identifying data 190.

When the specific identification data has been acquired, the specific information can be encapsulated in a caller information message 170 and provided to an enterprise application 160 associated with the directory assistance system 140 over the data communications network 120. Concurrently, the call between the caller 130 and the directory assistance system 140 can be established over the PSTN 110. Importantly, using the caller information 170, a call address 155 can be determined and provided to the call billing computation processor 150.

The call billing computation processor 150 in turn can compute the telephone charges for completing and maintaining a telephone call between the caller 130 and the telephone number returned by the lookup requested by the caller 130. The telephone charges can include a call set up charge and a per minute charge or a flat charge, based upon the address information 155 and any billing preferences indicated by the caller information 170, such as a special calling plan. Subsequently, the call billing computation processor 150 can provide the computed telephone charges to the directory assistance system 140 which in turn can prompt the caller 130 with the computed telephone charges in order to permit the caller 130 whether to activate automatic call completion.

Figure 2:
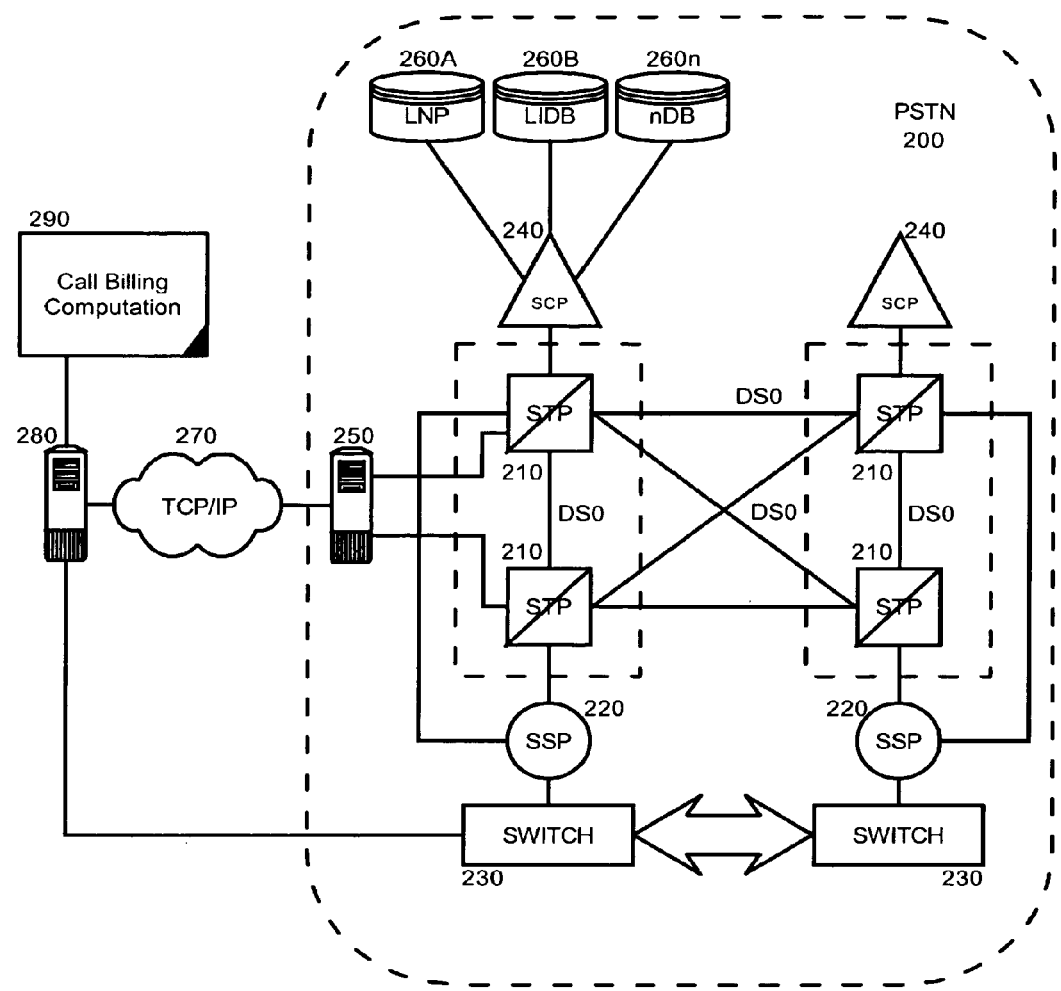
FIG. 2 is a schematic illustration of a system for providing automatic call completion in a directory assistance system utilizing billing data computed from location information acquired within the PSTN; and, FIG. 3 is a flow chart illustrating a process for providing automatic call completion in the system of FIG. 2.

To further illustrate the preferred embodiments of the present invention, FIG. 2 is a schematic illustration of a system for providing automatic call completion in a directory assistance system utilizing billing data computed from location information acquired within the PSTN. As shown in FIG. 2, a system for providing automatic call completion in a directory assistance system utilizing billing data computed from location information acquired within the PSTN can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to one or more databases 260A, 260B, 260n which can be configured to store invariant data such as the name, address and billing information for callers.

For example, the databases 260A, 260B, 260n can include a local number portability (LNP) database, a LIDB, or any other such database which can be accessed within an SCP 240.

Notably, as is well-known in the art, the information stored within the databases 260A, 260B, 260n can be stored in amorphous records in nothing more than a flat file database, an object database or a relational database. In any event, through the communicative linkages between the SCP 240, the STP 210 and the databases 260A, 260B, 260n, transaction capabilities application part (TCAP) messages can be processed in the SCP 240 to access the invariant data in the databases 260A, 260B, 260n. In this way, calls processed through the switch 230 can access logic in the SCP 240 and data in the databases 260A, 260B, 260n through the SSP 220.

Notably, a name resolution adapter 250 can be coupled to the out-of-band network comprised of inter-connected STPs 210 to access data and logic through the SCP 240 through an exchange of messages such as TCAP messages. The name resolution adapter 250 can include a gateway node 250 having both an interface to the PSTN 200 and also an interface to a data communications network 270 such as an Internet Protocol driven network. In this way, data received through the PSTN 200, and more particularly from accessing the databases 260A, 260B, 260n in the PSTN 200 can be passed within IP packets to an enterprise application 280 over the data communications network 270. Also, as the enterprise application 280 can be coupled to a switch 230 within the PSTN 200 through an associated adapter, data disposed within the databases 260A, 260B, 260n regarding an incoming call can be processed within the enterprise application 280.

In operation, the name resolution adapter 250 can monitor calls placed to a switch 230 to which the enterprise application 280 has been coupled. As calls are received in the switch 230, the name resolution adapter 250 can receive respective TCAP messages from the STP 210 coupled to the switch 230. Using the TCAP messages, the name resolution adapter 250 can create additional TCAP messages to query the LIDB 260B to identify the callers. For each TCAP message querying the LIDB 260B, the LIDB 260B can return the identity of the caller, for instance the caller's name, or other identification such as caller's address. Once the name resolution adapter 250 has received the identity of the caller from the LIDB 260B, the name resolution adapter 250 can transmit the identity to the enterprise application 280 over the data communications network 270. The enterprise application 280 subsequently can correlate the caller identity received from the name resolution adapter 250 with a corresponding call received through the switch 230.

In a preferred aspect of the present invention, call billing computation logic 290 can be coupled to the enterprise application 280. The call billing computation logic 290 can be configured to resolve both the location of a caller based upon location information disposed within the identity information provided by the name resolution adapter 250, and also the location of a telephone associated with a telephone number returned by a directory assistance lookup operation. Using the acquired location information, expected billing charges can be computed for completing and maintaining a call between the caller and the telephone number returned by the directory assistance lookup operation.

Figure 3:
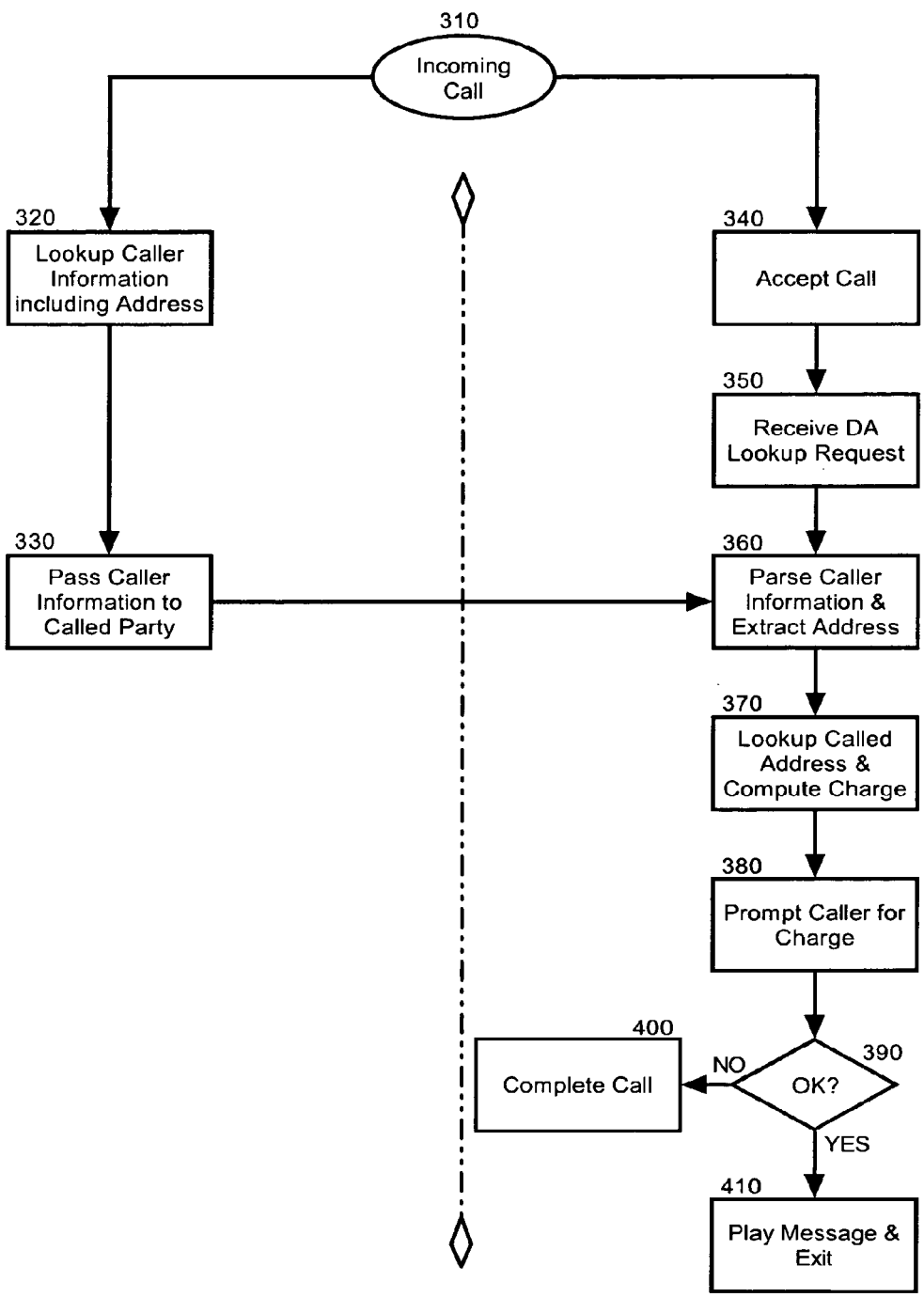

In further illustration, FIG. 3 is a flow chart illustrating a process for providing automatic call completion in the system of FIG. 2. As shown in FIG. 3, beginning in block 310, an incoming call can be detected in the PSTN and processed in the directory assistance system. In this regard, the incoming call can be processed in a switch in the PSTN in block 320 concurrently with the connection of the incoming call to the called party in block 340. More particularly, in block 320, caller information, including the address of the caller, can be retrieved from a database disposed within the PSTN, for instance a communicatively coupled LIDB. Subsequently, in block 330, the retrieved caller information can be forwarded to the enterprise system in the directory assistance system.

Within the directory assistance system in block 350 a directory assistance request can be received and in block 360, the caller information received from the PSTN can be parsed to extract the address of the calling party. In block 370, using the extracted address and an address for the telephone number specified by the directory assistance request a prospective charge for establishing and maintaining a telephone call between the caller and the telephone number can be computed. In block 380, the caller can be prompted with the computed charge. In particular, the caller can be informed of the computed charge and the caller can be asked whether or not to automatically complete the call to the telephone number. In decision block 390, if the caller chooses to automatically complete the call, in block 400 the call can be completed. Otherwise, in block 410 an exit message can be played back to the caller and the system can exit.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for providing automatic call completion in a directory assistance system in a public switched telephone network (PSTN), the system comprising:
    a telephone subscriber database disposed in a switch in the PSTN;
    a name resolution adapter disposed in the PSTN and coupled to said telephone subscriber database;
    a directory assistance system disposed externally to the PSTN and communicatively linked to said name resolution adapter over a data communications network; and,
    a call billing computation process coupled to said directory assistance system, a call billing computation process coupled to said directory assistance system the process first retrieving an address for a calling party issuing a directory assistance request from the PSTN and second retrieving an address for a telephone number produced by the directory assistance request, computing prospective telephone charges based upon said retrieved addresses, prompting said calling party with said computed prospective charges, and automatically completing a call between said calling party and said telephone number, wherein said first retrieving of the address comprises the steps of querying a line item database (LIDB) through a name resolution adapter disposed in the PSTN for an address for said calling party.

2. The system of claim 1, wherein said telephone subscriber database is a line item database (LIDB).

3. The system of claim 1, further comprising an interactive voice response system disposed in said directory assistance system and configured for interaction with calling parties.

4. A machine readable storage having stored thereon a computer program for providing automatic call completion in a directory assistance system in a public switched telephone network (PSTN), the computer program comprising a routine set of instructions which when executed by a machine cause the machine to perform the steps of:

receiving and processing a directory assistance request from a calling party over the PSTN;

first retrieving an address for said calling party from the PSTN and second retrieving an address for a telephone number produced by said directory assistance request;

computing prospective telephone charges based upon said retrieved addresses;

prompting said calling party with said computed prospective charges; and, automatically completing a call between said calling party and said telephone number wherein said first retrieving of the address comprises the steps of querying a line item database (LIDB) through a name resolution adapter disposed in the PSTN for an address for said calling party.

5. The machine readable storage of claim 4, wherein said processing step comprises the step of performing a telephone number lookup for said request in an enterprise system in a directory assistance system.

6. The machine readable storage of claim 4, wherein said processing step comprises the step of performing a reverse telephone number lookup for said request in an enterprise system in a directory assistance system.

7. The machine readable storage of claim 4, wherein said second retrieving step comprises the steps of:

receiving a data communications message from a name resolution adapter disposed within the PSTN;

extracting an address for said calling party from said message.

8. The machine readable storage of claim 4, wherein said second retrieving step comprises the steps of querying a line item database (LIDB) through a name resolution adapter disposed in the PSTN for an address for said calling party.

9. The machine readable storage of claim 4, wherein said computing step comprises the step of computing prospective telephone connection charges based upon said retrieved addresses.

10. The machine readable storage of claim 4, wherein said computing step comprises the step of computing prospective telephone per minute usage charges based upon said retrieved addresses.

11. The machine readable storage of claim 4, wherein said automatically completing step comprises the steps of:

receiving a selection from said calling party responsive to said prompting step;

completing said call if said selection indicates an affirmative choice by said calling party to complete said call; and, otherwise exiting.

* * * * *